Jan. 10, 1967  G. C. KINNAMON  3,296,977
PRESSURE LOADED PUMP

Filed Aug. 10, 1965  3 Sheets-Sheet 1

Inventor:
George C. Kinnamon
By Roger Schmiege Atty

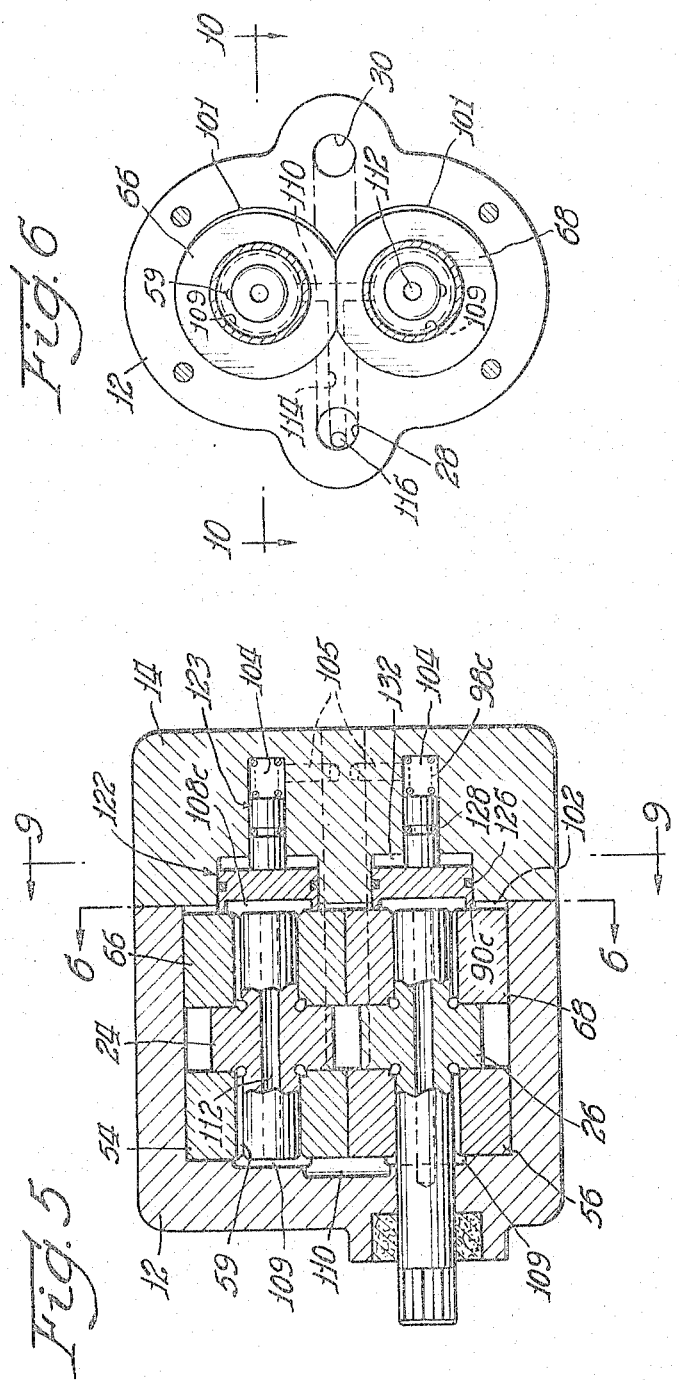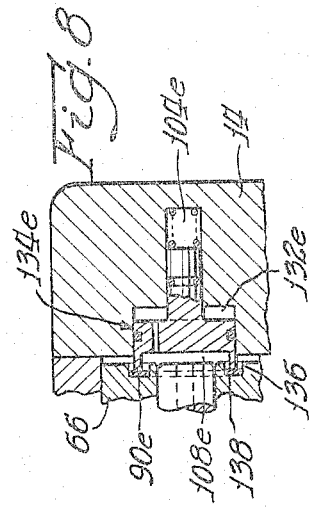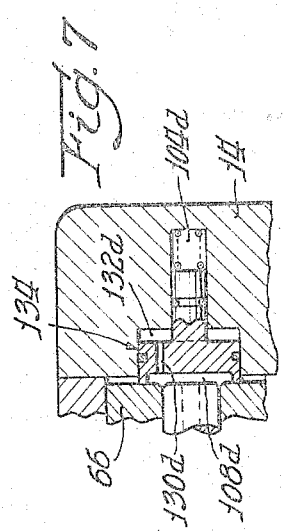

Jan. 10, 1967  G. C. KINNAMON  3,296,977
PRESSURE LOADED PUMP
Filed Aug. 10, 1965  3 Sheets-Sheet 3
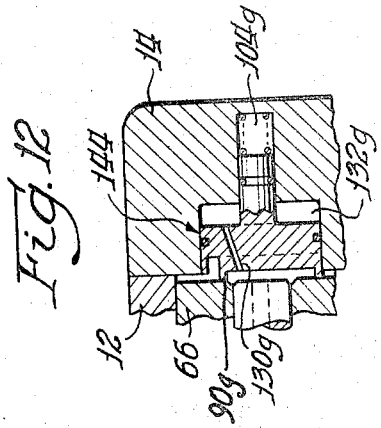
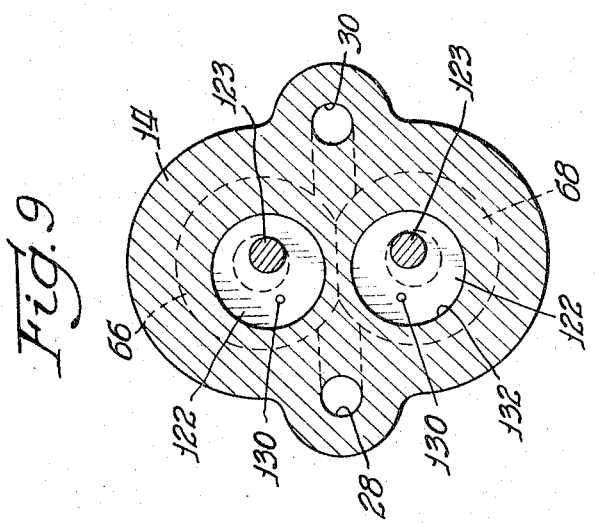
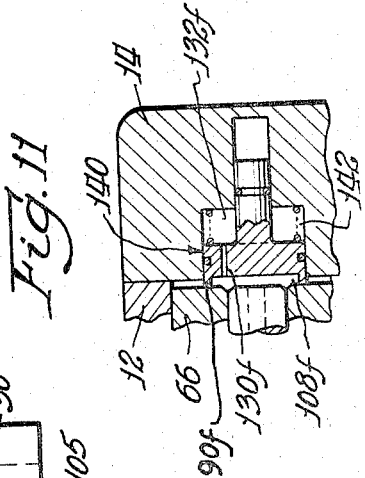
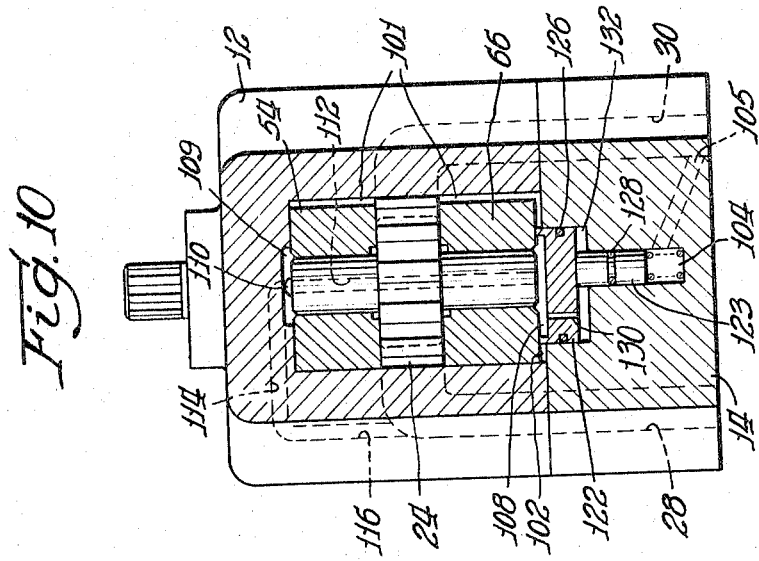
Inventor:
George C. Kinnamon
By: [signature] Atty

United States Patent Office 3,296,977
Patented Jan. 10, 1967

3,296,977
PRESSURE LOADED PUMP
George C. Kinnamon, Lyndhurst, Ohio, assignor to Borg-Warner Corporation, Chicago, Ill., a corporation of Illinois
Filed Aug. 10, 1965, Ser. No. 478,623
2 Claims. (Cl. 103—126)

This invention relates to pressure loaded gear pumps and more particularly to pressure loaded gear pumps that utilize pressure loadable bearings to maintain a sealing engagement between the bearings and the gears.

It is well known that many of the pressure loaded gear pumps prior to this invention were difficult to construct due to the necessity of having the bores of the main housing section aligned with the bores of the housing cover. It was important to have proper alignment between the main housing section and the housing cover inasmuch as a portion of the bearings on the journals extended into the housing cover from the main housing. Any misalignment between the housing cover bores and those of the main housing tended to cause misalignment of the bearings and journals. This misalignment of the bearings within the housing of the gear pump in turn caused internal leakage, especially high pressure leakage across the bearing faces and around the outer periphery of the bearings to low pressure. Thus, in order to obtain and maintain high operating efficiency, it was generally necessary to maintain extremely close tolerances in the alignment of the bores extending through a portion of each of the housing sections. Any significant amount of misalignment tended to substantially cut the efficiency of the pump. In small high pressure pumps, the efficiency, in some cases, was cut as much as 50 percent due to misalignment.

Inasmuch as perfect alignment of the bores in the main housing of a gear pump with the bores of the housing cover is impossible, or not economically feasible, it has been desired to design a pump which would not require close tolerance alignment of the housing cover with the main housing section.

Heretofore, it has been proposed to design a pump utilizing pistons at the rear of the pressure loadable bearings, which pistons eliminated bearing hubs extending into the cover plate to thus obviate the necessity of close tolerance alignment between the housing cover and the main housing. In one prior embodiment of a gear pump, a piston was designed to engage the axially movable pressure loadable bearings and urge them into engagement with the gear side faces to provide a seal therewith. This embodiment is shown in United States Patent 2,974,605 issued to J. F. Murray on March 14, 1961. Movement of the pistons in the Murray patent is accomplished by utilizing fluid pressure, from the outlet, behind the pistons to move them into engagement with the rear of the pressure loadable bearings. It will be noted that in this patent, outlet fluid pressure is exerted behind the piston and there are no means to confine journal leakage at inlet fluid pressure from immediately behind the pressure loadable bearings. Thus, high pressure leakage, along the outer periphery of the pressure loadable bearings, caused by internal pressure on the outlet side of the pump, is in communication with that portion of the rear of the bearings between the piston and the bearing end and journals, which portion is at low pressure. This high pressure leakage is substantial and adversely affects the operating efficiency of the pump.

A second embodiment of piston operated pressure loadable bearings is shown in British Patent 782,701 issued to H. E. Ashefield. In this patent, the rear of the pressure loadable bearings is subjected to a two-component loading means, one component of which acts axially on the bearings and the other of which acts radially on the bearings. In the Ashefield patent, the operating efficiency is also reduced due to high pressure leakage on the outer periphery of the bearings, which leakage is directed to the journals and in turn to inlet.

Briefly described, this invention is directed to a pressure loaded pump which utilizes a pressure confining loading member at the rear of the pressure loadable bearings. This loading member eliminates the need for integral bearing hubs, which are a source of alignment problem and also confines the outlet loading pressure to a specific portion on the outer periphery at the rear of the pressure loadable bearings for pressure loading the pump. Peripheral bearing leakage which normally occurs through the clearance gap between the housing and the bearings on the outlet side of the pump is substantially eliminated by this invention because there is no differential in pressure between the bearing faces adjacent to the gear on the outlet side of the pump and the rear of the pressure loadable bearings. The "clearance gap" referred to is caused by the internal parts being forced away from the outlet side and toward the inlet side as a result of high pressures being exerted on the bearings and gears on the outlet side of the pump. Further that high pressure fluid used for pressure loading behind the bearings is sealed from the journals. Likewise, in accordance with this invention, journal leakage at inlet pressure is confined to the rear of the journal by the pressure confining loading member means which extend from the housing cover and around the journals.

The loading members of this invention may be constructed in many different configurations, e.g., they may be of one-piece construction or separated into two separate cooperating members. For purposes of illustration, the loading members are shown in both one and two-piece constructions. Also, the rear of the loading members may be placed in communication with journal leakage at inlet pressure by a bore formed therethrough, or may be in communication with outlet pressure through porting which is in communication with the outlet port. The loading members may be centered with respect to the journals, i.e., without offset toward the outlet or inlet side, or the loading members may be slightly offset to overcome the pressure gradient condition which exists from inlet to outlet in a pump such as a vane pump, gear pump or the like.

The advantages of this invention will become apparent from a reading of the following description taken in conjunction with the accompanying drawings wherein:

FIGURE 5 is a cross-sectional view of a pressure loaded pump embodying two-piece loading member means of this invention;

FIGURE 6 is a cross-sectional view taken on line 6—6 of FIGURE 5;

FIGURE 7 is a cross-sectional view of another embodiment of a loading member means of this invention;

FIGURE 8 is still another cross-sectional view of an embodiment of the loading member means of this invention;

FIGURE 9 is a cross-sectional view taken on line 9—9 of FIGURE 5;

FIGURE 10 is a cross-sectional view taken on line 10—10 of FIGURE 5;

FIGURE 11 is a cross-sectional view of still another embodiment of the loading member means of this invention; and FIGURE 12 is a cross-sectional view of another embodiment of the loading member means of this invention.

Figure 1:
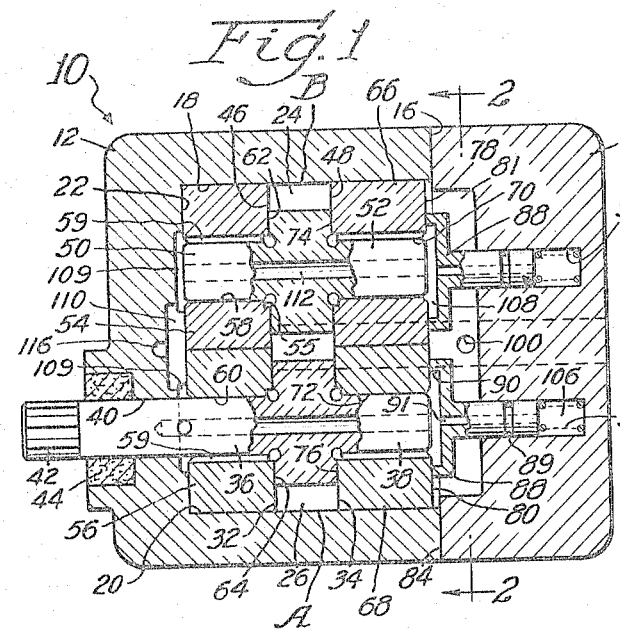
FIGURE 1 is an axial cross-sectional view of a pressure loaded pump embodying one of the loading member means of this invention.

Reference will now be made to the accompanying drawings wherein like reference numerals are used throughout the figures to indicate like parts and particular reference is made to FIGURES 1 and 5 which illustrate a gear pump generally indicated by the number 10. In accordance with the teachings of this invention, the gear pump is comprised of housing sections 12 and 14 which are suitably fastened together in aligned relationship by means of bolts or the like (not shown).

Housing section 12 is provided with and end surface 16 which is interrupted by a pair of parallel intersecting bores 18 and 20. Bores 18 and 20 define an end wall 22 within housing section 12.

Rotatable gears 24 and 26 are disposed respectively in the bores 18 and 20 and are adapted to receive fluid from an inlet 28 (shown in FIGURE 2) formed in the housing section 12, pressurize the same, and force the fluid out an outlet 30 (also shown in FIGURE 2) formed in the housing section 12, in a manner well known in the pump art.

The drive gear 26 has a pair of opposed, substantially flat, parallel side faces 32 and 34. The drive gear 26 is also provided with a pair of journals 36 and 38 extending respectively and centrally from the side faces 32 and 34 thereof. Journals 36 and 38 may be formed integrally with gear 26 in a manner well known in the art. Journal 36 comprises an elongated shaft adapted to project through a bore 40 formed in the housing section 12 whereby a suitable power source (not shown) may be coupled to an end 42 of the journal 36 to cause rotation of gear 26. Suitable seal means 44 are carried by the housing section 12 to prevent fluid leakage from the interior of the housing section 12 to the exterior of the housing section 12 through bore 40.

The driven gear 24 similar to the drive gear 26 has a pair of opposed substantially flat, parallel side faces 46 and 48 and a pair of journals 50 and 52 extending respectively and centrally from the side faces 46 and 48.

A pair of fixed bearings 54 and 56 are disposed respectively in bores 18 and 20 between wall 22 of housing section 12 and the respective side faces 46 and 32 of gears 24 and 26. Bearings 54 and 56 are provided respectively with bores 58 and 60 passing therethrough whereby the respective journals 50 and 36 of gears 24 and 26 are received and rotatably supported therein. Bearings 54 and 56 are provided respectively with substantially flat front faces 62 and 64 which cooperate with the side faces 46 and 32 of gears 24 and 26 to provide a pumping seal therewith. It will be noted that fixed bearings 54 and 56 may be provided with inner peripheral relief grooves 55 as well as axially extending grooves 59.

A pair of axially movable, pressure loadable bearings 66 and 68 are disposed respectively within bores 18 and 20 in the housing section 12 on the opposite side of the gears 24 and 26 from the fixed bearings 54 and 56. Bearings 66 and 68 are provided respectively with bores 70 and 72 passing centrally therethrough whereby the bores 70 and 72 are adapted to receive and rotatably support the respective journals 52 and 38 of gears 24 and 26 in a manner well known in the art. Bearings 66 and 68 are provided with substantially flat front faces 74 and 76 facing the gears 24 and 26 respectively. There are also rear surfaces 78 and 80 on bearings 66 and 68 which are subjected to outlet pressure for pressure loading of the bearings. That portion of the surfaces 78 and 80 which is subjected to loading pressure will be described in detail hereinafter.

It will be noted that bearings 56 and 68 and a portion of housing section 12 defined by bore 20 provide a pumping chamber A for gear 26. Similarly, bearings 54 and 66 together with a portion of housing section 12 defined by bore 18 provide a pumping chamber B for gear 24.

Figure 2:
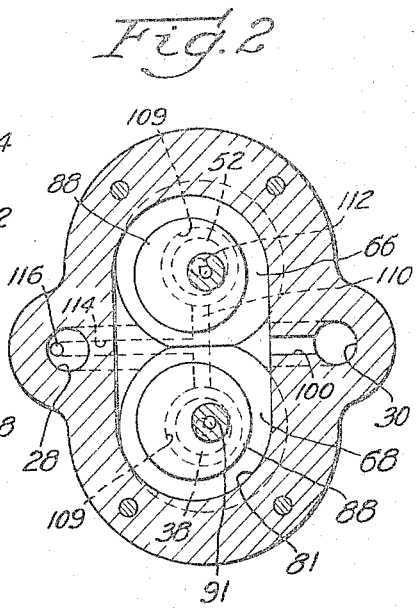
FIGURE 2 is a cross-sectional view taken on line 2—2 of FIGURE 1.

With respect to FIGURE 1, housing cover plate 14 is provided with a chamber 81 which interrupts the end surface 84 of section 14. Chamber 81 may be a single chamber of any desired configuration at the rear of the pressure loadable bearings as shown in FIGURE 2 or may be formed in two separate chambers as shown in FIGURE 5, which single chambers may be either eccentric or concentric with respect to the axes of journals 52 and 38 respectively. As shown in FIGURE 1, the outer circumference of chamber 81 extends around the outer circumference of the ends of the journals 38 and 52.

Referring to FIGURE 1, chamber 81 contains pressure confining loading member means 88, which means extend into bores 92 of cover plate 14 and form chambers 106 at the rear thereof. Loading members 88 may be provided with sealing rings 89 on their outer peripheries to seal chamber 81 from chambers 106. That end of the loading members 88 facing the pressure loadable bearings 66 and 68 is shown as having a larger diameter than that portion extending into cover plate 14. It should be noted that this is illustrative of one manner of construction. As shown, there are circumferentially extending sealing lips 90 on the members which form a seal between the loading members 88 and the pressure loadable bearings 66 and 68. Loading members 88 contain passages 91 extending therethrough (shown in broken outline in FIGURE 1) which place the journals 52 and 38 in communication with the base of bore 92, i.e., chamber 106 in cover plate 14. If offset loading is required, a portion or all of the loading members 88 may be eccentrically offset toward the inlet or outlet side of the pump to expose greater area to pressure on the outlet side and compensate for the pressure gradient existing between inlet and outlet. If offset loading is not required, the loading members may be concentrically aligned with respect to journals 52 and 38. There are springs 98 situated within chambers 106 at the base of bores 92, which springs are in contact with a rearwardly extending piston portion of loading members 88 and serve to urge the loading members into engagement with the pressure loadable bearings during starting of the pump. It will be noted that chamber 106 is sealed from chamber 81 by means of a sealing ring 89 extending around the piston portion of loading member 88, however, a piston fit without a ring is operable.

Throughout the operation of that pump shown in FIGURE 1, fluid at outlet pressure is conveyed from the outlet side of the pump via port 100 to chamber 81 at the rear of the pressure loadable bearings 66 and 68 respectively. This outlet fluid pressure within chamber 81 exerts a force on the rear surface of the forwardly extending large diameter portion of pressure confining means 88 facing bearings 66 and 68. Outlet fluid pressure also exerts force on surfaces 78 and 80 of bearings 66 and 68 respectively. This force from the high outlet pressure urges bearings 66 and 68 toward the side faces of gears 24 and 26 to provide a pumping seal therewith.

With respect to FIGURE 5, it will be noted that outlet pressure is directed via ports 105 (shown in broken outline in FIGURE 5) to the rear of the two-piece loading member means 122 and 123, i.e., to chamber 104. The outlet pressure within chamber 104 serves to urge the piston member 123 and larger diameter portion 122 of the loading member means to the left, i.e., into engagement with the pressure loadable bearings 66 and 68 to move the bearings into sealing engagement with the gear side faces to provide a pumping seal therewith. The porting of the pump shown in FIGURE 5 is best illustrated in FIGURE 10. As shown in the cross-section of FIGURE 5, i.e., FIGURE 6, the bearings are moved slightly to the left, i.e., toward the inlet side due to high pressure exerted on the outlet side of the pump. This movement of the bearings leaves a clearance gap 101 along the outer periphery of the bearings on the outlet side. Outlet pressure is exerted through gap 101 to chambers 102 situated at the rear of the pressure loadable bearings 66 and 68. This high pressure is confined within chambers 102 by pressure confining means 122 and is not allowed to leak to inlet. The fluid pressure within chambers 102, in fact, cooperates with the high pressure in chambers 104 to exert force on the pressure loadable bearings 66 and 68, as well as the pressure confining means 122 and 123, to urge the bearings into sealing engagement with the side faces of gears 24 and 26 respectively.

In those embodiments of the pumps described in FIGURES 1 and 5, there is journal leakage flow at inlet pressure that passes along the axial grooves 59 of the journals, which grooves extend between the pumping chambers A and B and chambers 108 (defined as that area within the inner circumference of lips 90 of loading members 88) and chambers 109 formed in housing section 12 at the end of journals 50 and 36 and adjacent end wall 22. The leakage at inlet pressure within chambers 108 is sealed from chamber 81 (high pressure loading chamber) as shown in FIGURE 1 and chambers 102 and 104 (high pressure loading chambers) as shown in FIGURE 5, by the contact of lips 90 on loading members 88.

As shown in FIGURE 1, leakage at inlet pressure passes from chamber 108 through ports 91 of loading member 88 to the base of bore 92, i.e., chamber 106. Thus, there is inlet pressure at the rear of loading member means 88 in FIGURE 1. Leakage at inlet pressure within chamber 108 also passes via journal centerholes 112 of journals 36, 38, 50 and 52 to chamber 109 at the journal ends adjacent end wall 22 of housing section 12. Leakage at inlet pressure within chamber 109 is passed via ports 110, 114, and 116 to inlet 28 as best shown in FIGURE 10. A valve, not shown, may be incorporated in port 114 or 116 to maintain some degree of pressurization of the lubrication and cooling circuit if desired.

The aforementioned leakage flow across the gear faces which in turn flows through grooves 59 to chambers 108 and 109 provides lubrication of the bores 70 and 72 as well as for journals 52 and 38 respectively and bores 58 and 60 for journals 50 and 36 respectively. This flow also acts as a bearing coolant.

The foregoing description of loading members for a gear pump was directed primarily to FIGURES 1 and 5. The gear pumps illustrated in FIGURES 1 and 5 set forth an illustrative operating environment for the loading members of this invention.

FIGURE 2 illustrates the versatility of the loading member means 88. In FIGURE 2, the rear portions of loading member means 88, i.e., those portions extending into bores 92 of housing 14, are offset toward the outlet side and the larger diameter forward portions of members 88, containing lips 90 are offset toward the inlet side of the pump. Thus, it is possible to obtain a proper balance of loading pressure on the rear of the pressure loadable bearings 66 and 68 and compensate for any pressure gradient existing between inlet and outlet.

Those loading members shown in FIGURES 3 and 4 hereinafter described are similar to loading members 88 of FIGURE 1 and similar parts bear the same number with letters to indicate that they are not identical.

Figure 3:
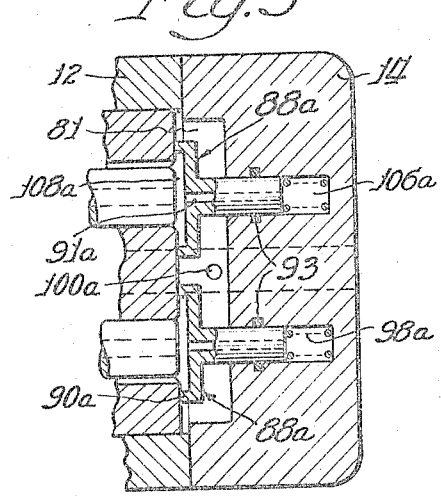
FIGURE 3 is a cross-sectional view of another embodiment of the loading member means of this invention.

Referring now to FIGURE 3, there are loading members 88a which are similar to loading members 88 of FIGURE 1. In FIGURE 3, loading members 88a are provided with sealing members 93 formed within the housing cover 14. It will be understood that the manner of sealing chambers 81 from chambers 106a may be accomplished by either placing the seal on the loading members as shown in FIGURE 1 or within the housing section as shown in FIGURE 3. Separate sealing means may be eliminated if a piston fit is provided.

Figure 4:
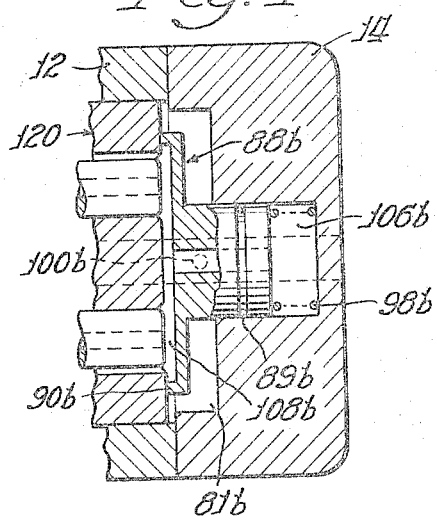
FIGURE 4 is a cross-sectional view of a loading member means as applied to a one-piece figure-eight pressure loadable bearing.

FIGURE 4 illustrates loading member means 88b as a pressure confining loading member adapted for application as a one-piece "figure-eight" bearing structure such as bearing 120 of FIGURE 4. The figure-eight bearing 120 is designed to carry two journals. The operation of the loading member means 88b of FIGURE 4 is substantially the same as that of loading member means 88 shown in FIGURE 1 and 88a shown in FIGURE 3. Further, the loading member 88b may be either concentrically or eccentrically aligned with respect to the journals, depending, of course, on whether offset loading is desired or required.

The loading member shown in combination with a gear pump in FIGURE 5 is a two-piece loading member comprised of bearing loading members 122 and piston members 123. It will be noted that the two-piece loading members are provided with peripheral seals 126 on the bearing loading member means 122, i.e., those means which contact the pressure loadable bearings 66 and 68 and seals 128 on the outer periphery of rear picton portions 123 which extend into housing cover plate 14. As illustrated in FIGURE 9, members 122 contain ports 130 (not shown in FIGURE 5) extending therethrough which lead to chambers 132 at the rear of load bearing members 122. Chambers 132 are in fluid communication with chambers 108 and thus are adapted to be filled with fluid at low pressure, i.e., inlet pressure from the journals.

As indicated above, FIGURE 10 illustrates the manner in which the loading chambers 104 at the rear of piston members 123 are placed in communication with outlet pressure via ports 105.

FIGURE 7 is a loading member 134 similar to the two-piece loading member shown in FIGURE 5, i.e., it has high pressure loading from the rear chamber 104, however, is of one-piece construction. Loading member 134 is provided with a port 130d to place chamber 108d in fluid communication with chamber 132d. It will be noted that the construction of loading member 134 may not involve as many machining steps as the two-piece construction of FIGURE 5.

FIGURE 8 is a loading member similar to that shown in FIGURE 7. As shown in FIGURE 8, the pressure loadable bearing 66 is provided with a circumferentially extending bore 136 and an extrusion resistant O-ring 138 on which the lip 90e of the loading member 134e bears to form a seal therewith. This embodiment may be utilized if it is necessary or desirable to eliminate a metal-to-metal seal between the loading members 134e and the pressure loadable bearings 66 and 68.

FIGURE 11 illustrates a loading member 140 similar to FIGURE 8 wherein the spring 98 at the rear of the loading member (as shown in FIGURE 1) is eliminated and a spring 142 is placed in chamber 132 to bear against the loading member 140 to place it in contact with the rear of a pressure loadable bearing such as 66 and 68. This spring, as mentioned above, serves to maintain a seal during start-up. Also, FIGURE 11 has a metal-to-metal seal between lips 90f and bearings 66.

FIGURE 12 illustrates a loading member wherein the desired shape of the sealing lips 90g on the loading members may be varied to provide an eccentric or concentric surface or any other configuration of seal for versatility in loading the pump.

*Operation*

The gear pumps shown in FIGURES 1 and 5 are illustrative of the manner in which the loading members of this invention may be utilized, however, other pump embodiments are equally operable without any substantial change in the loading members. As shown in FIGURES 1 and 5, journal 36 of drive gear 26 is rotated by a suitable power source (not shown) in a clockwise direction. The driven gear 24 will be rotated in a counterclockwise direction by meshing of the gear teeth of gears 24 and 26. As the gears rotate, vacuum is generated by separation of meshed gear teeth which causes fluid to be forced into the opening gear teeth space adjacent inlet 28. The fluid thus entrapped between successive pairs of gear teeth is conveyed around the bores 18 and 20 to the outlet 30 in a manner well known in the art.

Fluid conveyed to the outlet 30 is displaced by the action of the intermeshing of the teeth and in turn is transmitted and placed under a high pressure. This outlet pressure is transmitted via port 100 as shown in FIGURE 1 (also it may be transmitted via clearance gap 101 to the rear of pressure loadable bearings 66 and 68 as shown in FIGURE 6) to the pressure loading chamber 81. The fluid pressure within chamber 81 exerts force on loading member 88 as above described to move the bearings into sealing engagement with the gear side faces.

In the embodiment shown in FIGURE 5, outlet fluid pressure is transmitted via passage 105 to chamber 104, at the rear of the pressure loading members 122 and 123. Outlet fluid pressure within chambers 104 forces the loading member means 122 and 123 to the left and the lips 90 on members 122 engage and move the pressure loadable bearings 66 and 68 into sealing engagement with the gear side faces to provide a pumping seal therewith.

The lips 90 of the loading members sealingly engage the rear of the pressure loadable bearings to seal chamber 81 from chambers 108 as shown in FIGURE 1 and chambers 102 and 104 from chamber 108c as shown in FIGURE 5.

It will be noted that by varying the placement, configuration and area of the loading members in the figures as above-described, any degree of loading including offset loading may be obtained with a minimum of effort and a maximum of efficiency. The sizes and areas shown in the sketches are not necessarily those required for the correct degree of loading, but are shown only to illustrate the principles of the invention.

When utilizing this invention, proper alignment is maintained between the moving parts within the pump housing without the necessity of high tolerance machining of the cover plate 14 to fit housing 12. Thus, cocking of the bearings is substantially eliminated without the necessity of close tolerance machining.

It is commonly known that internal leakage is one of the largest factors affecting the operating efficiency of a pump. It has been found that this invention substantially improves the operating efficiency of a pump due to the elimination of high pressure internal leakage around the outer periphery of the pressure loadable bearing on outlet side.

It will be understood that the pressure confining loading members for pressure loaded pumps of this invention have been described with respect to certain specific embodiments. However, it should be understood that this description is by way of illustration and not by way of limitation and that the scope of this invention is defined solely by the appended claims which should be construed as broadly as the prior art will permit.

What is claimed is:

1. In a pressure loadable gear pump, the combination comprising:

a housing including a cover plate;
   means defining a pumping chamber in said housing;
   an inlet leading to and an outlet leading from said pumping chamber;
   rotatable pumping means disposed in said pumping chamber for drawing fluid from said inlet under inlet pressure, pressurizing the fluid and forcing it out said outlet under outlet pressure, said pumping means provided with axially extending journals;
   bearing means situated in said housing and adapted for rotatably mounting said journals;
   at least one of said bearing means being an axially movable pressure loadable bearing means, said pressure loadable, bearing means having means defining pressure loading chambers at the rear thereof, which loading chambers are adapted to be subjected to outlet pressures;
   first fluid communication means between said outlet and said pressure loading chamber means at the rear of said pressure loadable bearings for directing outlet fluid pressure to said chamber means;
   second fluid communication means between said journals and said inlet for directing journal leakage to said inlet;
   pressure confining loading member means circumferentially extending around said journals and in sealing engagement with said pressure loadable bearing means, said loading member means having forward portions of large diameter and rearward piston portions extending into said cover plate, said larger diameter forward portions adapted to seal said journals from said loading chamber means,
   said forward portion of said loading member means overlaying said journals and engaging said pressure loadable bearings to define low pressure chamber means and said piston portions extending into said cover plate to define high pressure loading chamber means;
   said high pressure loading chamber means at the rear of said loading member means being in communication with said outlet by means of said first communication means;
   said forward portions of said loading member means characterized by being offset toward the inlet side of the pump and said rearward piston portions being offset toward the outlet side of the pump, whereby said loading member means compensate for that pressure gradient condition existing between inlet and outlet.

2. In a pressure loadable gear pump, the combination comprising:

a housing including a cover plate;
   means defining a pumping chamber in said housing;
   an inlet leading to and an outlet leading from said pumping chamber;
   rotatable pumping means disposed in said pumping chamber for drawing fluid from said inlet under inlet pressure, pressurizing the fluid and forcing it out said outlet under outlet pressure, said pumping means provided with axially extending journals;
   bearing means situated in said housing and adapted for rotatably mounting said journals;
   at least one of said bearing means being an axially movable pressure loadable bearing means, said pressure loadable bearing means having means defining pressure loading chambers at the rear thereof, which loading chambers are adapted to be subjected to outlet pressure;
   first fluid communication means between said outlet and said pressure loading chamber means at the rear of said pressure loadable bearings for directing outlet fluid pressure to said chamber means;
   second fluid communication means between said journals and said inlet for directing journal leakage to said inlet;
   first and second loading member means associated with each pressure loadable bearing and adapted to seal said loading chamber means from said journals at the rear of said pressure loadable bearings, said first loading member means circumferentially extending around said journals and in sealing engagement with said pressure loadable bearing means, said second loading member means abutting said first loading member means and extending into said cover plate;
   said first loading member means having forward portions with sealing lips thereon overlaying said journals and engaging said pressure loadable bearings to define low pressure chamber at the end of said journals, said second loading member means in said cover plate defining chambers which are in communication with said low pressure chambers; and said pressure loading chambers adapted to exert force on the first loading member means and urge said loading member means into sealing engagement with said pressure loadable bearings to force said bearings into sealing engagement with said gears.

References Cited by the Examiner

UNITED STATES PATENTS

| | | | |
|---|---|---|---|
| 2,974,605 | 3/1961 | Murray | 103—126 |
| 3,034,448 | 5/1962 | Brundage | 103—126 |
| 3,051,091 | 8/1962 | Bennett et al. | 103—126 |
| 3,083,645 | 4/1963 | Donner et al. | 103—126 |
| 3,127,843 | 4/1964 | Brundage | 103—126 |
| 3,150,599 | 9/1964 | Laumont | 103—126 |
| 3,194,168 | 7/1965 | Rosaen | 103—126 |
| 3,203,355 | 8/1965 | Purcell | 103—126 |

FOREIGN PATENTS

| | | |
|---|---|---|
| 782,701 | 9/1957 | Great Britain. |
| 932,156 | 7/1963 | Great Britain. |

MARK NEWMAN, *Primary Examiner.*

WILBUR J. GOODLIN, *Examiner.*